United States Patent
Ho et al.

(10) Patent No.: US 11,374,253 B2
(45) Date of Patent: *Jun. 28, 2022

(54) ELECTRODE ASSEMBLIES

(71) Applicant: GRST International Limited, Hong Kong (CN)

(72) Inventors: Kam Piu Ho, Hong Kong (CN); Ranshi Wang, Hong Kong (CN); Peihua Shen, Guangdong (CN)

(73) Assignee: GRST INTERNATIONAL LIMITED, Hong Kong (CN)

( * ) Notice: Subject to any disclaimer, the term of this patent is extended or adjusted under 35 U.S.C. 154(b) by 45 days.

This patent is subject to a terminal disclaimer.

(21) Appl. No.: 17/099,854

(22) Filed: Nov. 17, 2020

(65) Prior Publication Data

US 2021/0091406 A1 Mar. 25, 2021

Related U.S. Application Data

(63) Continuation of application No. 15/272,494, filed on Sep. 22, 2016, now Pat. No. 10,923,760.

(51) Int. Cl.
| | |
|---|---|
| *H01M 10/0525* | (2010.01) |
| *H01M 4/62* | (2006.01) |
| *H01M 4/04* | (2006.01) |
| *H01M 4/13* | (2010.01) |
| *H01M 4/139* | (2010.01) |
| *H01M 50/44* | (2021.01) |
| *H01M 50/411* | (2021.01) |
| *H01M 4/02* | (2006.01) |

(52) U.S. Cl.
CPC ....... *H01M 10/0525* (2013.01); *H01M 4/043* (2013.01); *H01M 4/0404* (2013.01); *H01M 4/0471* (2013.01); *H01M 4/13* (2013.01); *H01M 4/139* (2013.01); *H01M 4/62* (2013.01); *H01M 4/622* (2013.01); *H01M 50/411* (2021.01); *H01M 50/44* (2021.01); *H01M 4/623* (2013.01); *H01M 2004/021* (2013.01); *Y02T 10/70* (2013.01)

(58) Field of Classification Search
None
See application file for complete search history.

(56) References Cited

U.S. PATENT DOCUMENTS

| | | | |
|---|---|---|---|
| 10,923,760 B2 * | 2/2021 | Ho | ........................ H01M 4/043 |
| 2006/0269844 A1 | 11/2006 | Deng et al. | |
| 2008/0008933 A1 | 1/2008 | Lampe-Onnerud | |
| 2008/0102359 A1 | 5/2008 | Kogetsu et al. | |
| 2013/0101893 A1 | 4/2013 | Dai et al. | |
| 2015/0099158 A1 | 4/2015 | Iwase | |

FOREIGN PATENT DOCUMENTS

| | | |
|---|---|---|
| CN | 103344097 B | 1/2015 |
| CN | 102735023 B | 12/2015 |
| CN | 105115250 A | 12/2015 |
| CN | 104142045 B | 3/2016 |
| KR | 1020060003665 A | 1/2006 |

* cited by examiner

*Primary Examiner* — Carmen V Lyles-Irving
(74) *Attorney, Agent, or Firm* — Kam Wah Law

(57) ABSTRACT

Provided herein is an electrode assembly of lithium-ion battery, comprising at least one anode, at least one cathode and at least one separator interposed between the at least one anode and at least one cathode, wherein the water content of the electrode assembly is less than 20 ppm by weight, based on the total weight of the electrode assembly.

16 Claims, 2 Drawing Sheets

ELECTRODE ASSEMBLIES

CROSS-REFERENCE TO RELATED APPLICATIONS

This application is a continuation of U.S. application Ser. No. 15/272,494, filed Sep. 22, 2016, which is incorporated herein by reference in its entirety.

FIELD OF THE INVENTION

The present invention relates to the field of batteries. In particular, this invention relates to methods for drying electrode assemblies of lithium-ion batteries and electrode assemblies made by the methods disclosed herein.

BACKGROUND OF THE INVENTION

Lithium-ion batteries (LIBs) have attracted extensive attention in the past two decades for a wide range of applications in portable electronic devices such as cellular phones and laptop computers. Due to rapid market development of electric vehicles (EV) and grid energy storage, high-performance, low-cost LIBs are currently offering one of the most promising options for large-scale energy storage devices.

Currently, electrodes are prepared by dispersing fine powders of an active battery electrode material, a conductive agent, and a binder material in an appropriate solvent. The dispersion can be coated onto a current collector such as a copper or aluminum metal foil, and then dried at an elevated temperature to remove the solvent. Sheets of the cathode and anode are subsequently stacked or rolled with the separator separating the cathode and anode to form a battery.

The lithium-ion battery manufacturing process is sensitive to moisture. A battery with high water content leads to serious attenuation of electrochemical performance and affects stability of battery. Therefore, environmental humidity must be controlled strictly for the production process of LIBs. Most of the LIBs are produced in an environment with less than 1 percent humidity. However, significant cost is incurred because of the stringent moisture-free process. To address the moisture sensitive issue of electrode assembly, it is important to dry the electrode assembly prior to electrolyte filing so as to reduce the water content in the battery.

Chinese Patent No. 104142045 B describes a method of drying an electrode assembly of LIBs. The method comprises heating an electrode assembly under vacuum at a temperature of 30-100° C.; filling the oven with dry air or inert gas; repeating these two steps for 1-10 times. This method provides the electrode assembly with a water content between 430.5 ppm and 488.1 ppm.

Chinese Patent Application No. 105115250 A describes a method of drying an electrode assembly of LIBs. The method comprises heating an electrode assembly under vacuum at a temperature of 85±5° C.; filling the oven with hot, dry nitrogen gas; repeating these two steps for 10-20 times. This method provides the electrode assembly with a water content of less than 200 ppm.

Chinese Patent No. 102735023 B describes a method of drying an electrode assembly of LIBs. The method comprises heating an electrode assembly under vacuum at a temperature of 20-70° C.; filling the oven with dry air or nitrogen gas; repeating these two steps for 5-50 times. This method provides the electrode assembly with a water content between 110.1 ppm and 137.2 ppm.

Chinese Patent No. 103344097 B describes a method of drying an electrode assembly of LIBs. The method comprises heating an electrode assembly under vacuum at a temperature of 75-85° C.; filling the oven with a non-oxidizing gas; heating the electrode assembly to 75-85° C.; vacuum drying the electrode assembly again. However, this method does not provide the water content of the dried electrode assembly for evaluating the drying process.

The water contents of the electrode assemblies as dried by the existing methods range from a hundred ppm to several hundreds ppm, which may affect the cycling stability and rate capability of LIBs. In view of the above, there is always a need for electrode assemblies having a low water content.

SUMMARY OF THE INVENTION

The aforementioned needs are met by various aspects and embodiments disclosed herein.

In one aspect, provided herein is an electrode assembly for a nonaqueous electrolyte secondary battery, comprising at least one anode, at least one cathode and at least one separator interposed between the at least one anode and at least one cathode, wherein the water content of the electrode assembly is less than 20 ppm by weight, based on the total weight of the electrode assembly.

In certain embodiments, the at least one cathode comprises a cathode current collector and a cathode electrode layer comprising a cathode material, a binder material and a conductive agent, and the at least one anode comprises an anode current collector and an anode electrode layer comprising an anode material, a binder material and a conductive agent, wherein each of the cathode and anode electrode layers independently has a void volume of less than 40%, less than 35%, less than 33%, less than 30%, less than 25%, less than 20%, less than 18%, less than 15%, less than 13%, less than 10%, or less than 8%, based on the total volume of the electrode layer.

In some embodiments, the density of each of the cathode and anode electrode layers is independently from about 1.0 g/cm$^3$ to about 6.5 g/cm$^3$ or from about 1.0 g/cm$^3$ to about 3.0 g/cm$^3$.

In certain embodiments, the thickness of each of the cathode and anode electrode layers is independently from about 1.0 μm to about 40 μm or from about 1.0 μm to about 25 μm.

In some embodiments, the at least one separator is made of polymeric fibers selected from the group consisting of polyolefin, polyethylene, high-density polyethylene, linear low-density polyethylene, low-density polyethylene, ultra-high-molecular-weight polyethylene, polypropylene, polypropylene/polyethylene co-polymer, polybutylene, polypentene, polyacetal, polyamide, polycarbonate, polyimide, polyetherether ketone, polysulfones, polyphenylene oxide, polyphenylene sulfide, polyacrylonitrile, polyvinylidene fluoride, polyoxymethylene, polyvinyl pyrrolidone, polyester, polyethylene terephthalate, polybutylene terephthalate, polyethylene naphthalene, polybutylene naphthalate, and combinations thereof.

In certain embodiments, the thickness of the separator is from about 1.0 μm to about 40 μm or from about 1.0 μm to about 25 μm.

In some embodiments, each of the binder materials in the cathode and anode electrode layers is independently selected from the group consisting of styrene-butadiene rubber, acrylated styrene-butadiene rubber, acrylonitrile copolymer, acrylonitrile-butadiene rubber, nitrile butadiene rubber, acrylonitrile-styrene-butadiene copolymer, acryl rubber, butyl rubber, fluorine rubber, polytetrafluoroethylene, polyethylene, polypropylene, ethylene/propylene copolymers, polybutadiene, polyethylene oxide, chlorosulfonated polyethylene, polyvinylpyrrolidone, polyvinylpyridine, polyvinyl alcohol, polyvinyl acetate, polyepichlorohydrin, polyphosphazene, polyacrylonitrile, polystyrene, latex, acrylic resins, phenolic resins, epoxy resins, carboxymethyl cellulose, hydroxypropyl cellulose, cellulose acetate, cellulose acetate butyrate, cellulose acetate propionate, cyanoethylcellulose, cyanoethylsucrose, polyester, polyamide, polyether, polyimide, polycarboxylate, polycarboxylic acid, polyacrylic acid, polyacrylate, polymethacrylic acid, polymethacrylate, polyacrylamide, polyurethane, fluorinated polymer, chlorinated polymer, a salt of alginic acid, polyvinylidene fluoride, poly(vinylidene fluoride)-hexafluoropropene, and combinations thereof.

In certain embodiments, each of the binder materials in the cathode and anode electrode layers is independently present in an amount from 2% to 10% by weight, based on the total weight of the electrode layer.

In some embodiments, the cathode material is selected from the group consisting of $LiCoO_2$, $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, and combinations thereof, wherein each x is independently from 0.3 to 0.8; each y is independently from 0.1 to 0.45; and each z is independently from 0 to 0.2.

In certain embodiments, each of the conductive agents in the cathode and anode electrode layers is independently selected from the group consisting of carbon, carbon black, graphite, expanded graphite, graphene, graphene nanoplatelets, carbon fibres, carbon nano-fibers, graphitized carbon flake, carbon tubes, carbon nanotubes, activated carbon, mesoporous carbon, and combinations thereof.

In some embodiments, each of the conductive agents in the cathode and anode electrode layers is independently present in an amount from 2% to 10% by weight, based on the total weight of the electrode layer.

In certain embodiments, the anode material is selected from the group consisting of natural graphite particulate, synthetic graphite particulate, Sn particulate, $Li_4Ti_5O_{12}$ particulate, Si particulate, Si—C composite particulate, and combinations thereof.

In some embodiments, each of the current collectors of the at least one cathode and anode is independently stainless steel, titanium, nickel, aluminum, copper, or electrically-conductive resin.

In certain embodiments, the current collector of the at least one cathode is an aluminum thin film, and wherein the current collector of the at least one anode is a copper thin film.

In some embodiments, the at least one anode and at least one cathode in the electrode assembly have a water content of less than 20 ppm by weight, based on the total weight of the at least one anode and at least one cathode.

In certain embodiments, the at least one separator in the electrode assembly has a water content of less than 20 ppm by weight, based on the total weight of the at least one separator.

In another aspect, provided herein is a lithium battery comprising the electrode assembly prepared by the method disclosed herein.

DETAILED DESCRIPTION OF THE INVENTION

Figure 1:
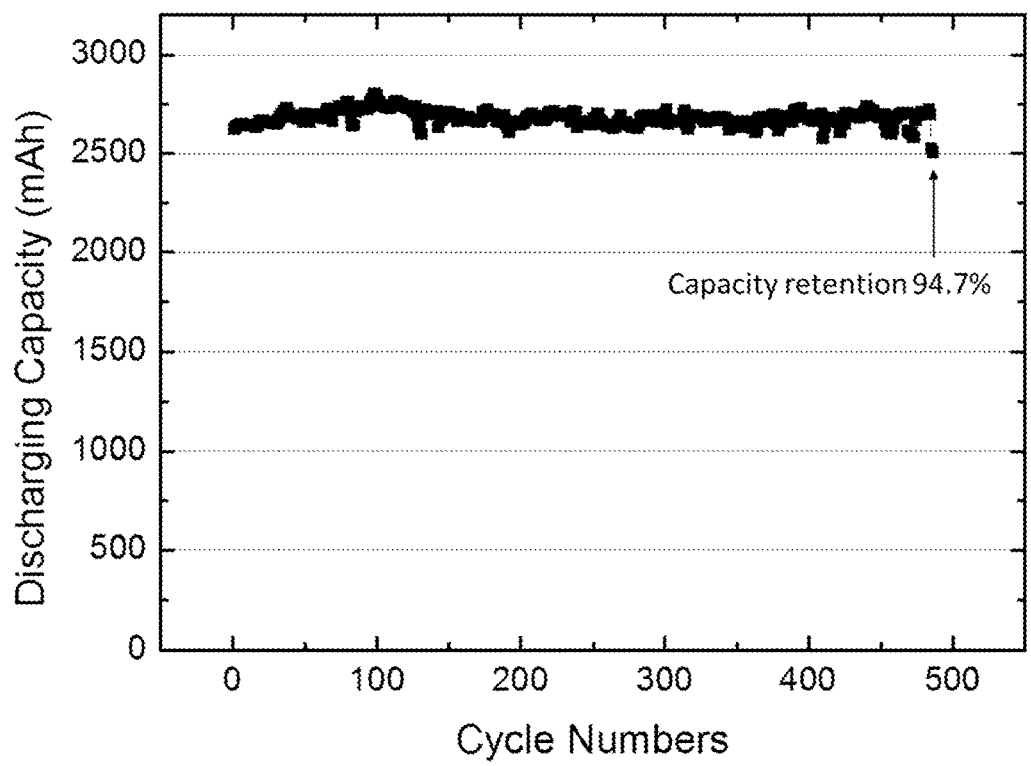
FIG. 1 depicts cycling performance of an electrochemical cell containing an electrode assembly prepared by the method described in Example 2.

Provided herein is an electrode assembly for a nonaqueous electrolyte secondary battery, comprising at least one anode, at least one cathode and at least one separator interposed between the at least one anode and at least one cathode, wherein the water content of the electrode assembly is less than 20 ppm by weight, based on the total weight of the electrode assembly.

The term "electrode" refers to a "cathode" or an "anode."

The term "positive electrode" is used interchangeably with cathode. Likewise, the term "negative electrode" is used interchangeably with anode.

The term "void volume" refers to the volume of the spaces between the solid materials in the electrode layer. The greater the void volume, the more electrolyte is retained in the electrode layer.

The term "binder material" refers to a chemical or a substance that can be used to hold the electrode material and conductive agent in place.

The term "water-based binder material" refers to a water-soluble or water-dispersible binder polymer. Some non-limiting examples of the water-based binder material include styrene-butadiene rubber, acrylated styrene-butadiene rubber, acrylonitrile-butadiene rubber, acryl rubber, butyl rubber, fluorine rubber, polytetrafluoroethylene, polyethylene, polypropylene, ethylene/propylene copolymers, polybutadiene, polyethylene oxide, polyvinylpyrrolidone, polyepichlorohydrin, polyphosphazene, polyacrylonitrile, polystyrene, ethylene/propylene/diene copolymers, polyvinylpyridine, chlorosulfonated polyethylene, latex, polyester resins, acrylic resins, phenolic resins, epoxy resins, polyvinyl alcohol, carboxymethyl cellulose, hydroxypropyl cellulose, and combinations thereof.

The term "organic-based binder material" refers to a binder dissolved or dispersed in an organic solvent, in particular, N-methyl pyrrolidone (NMP). Some non-limiting examples of the organic-based binder material include polytetrafluoroethylene (PTFE), perfluoroalkoxy polymer (PFA), polyvinylidene fluoride (PVDF), copolymer of tetrafluoroethylene (TFE) and hexafluoropropylene (HFP), fluorinated ethylene-propylene (FEP) copolymer, and terpolymer of tetrafluoroethylene, hexafluoropropylene and vinylidene fluoride, and combinations thereof.

The term "current collector" refers to a support for coating the electrode material and a chemically inactive high electron conductor for keeping an electric current flowing to electrodes during discharging or charging a secondary battery.

The term "conductive agent" refers to a material which is chemically inactive and has good electrical conductivity. Therefore, the conductive agent is often mixed with an electrode active material at the time of forming an electrode to improve electrical conductivity of the electrode. In some embodiments, the conductive agent is a carbonaceous material.

The term "electrode assembly" refers to a structure comprising at least one positive electrode, at least one negative electrode, and at least one separator interposed between the positive electrode and the negative electrode.

The term "room temperature" refers to indoor temperatures from about 18° C. to about 30° C., e.g., 18, 19, 20, 21, 22, 23, 24, 25, 26, 27, 28, 29, or 30° C. In some embodiments, room temperature refers to a temperature of about 20° C.+/−1° C. or +/−2° C. or +/−3° C. In other embodiments, room temperature refers to a temperature of about 22° C. or about 25° C.

The term "C rate" refers to the charging or discharging rate of a cell or battery, expressed in terms of its total storage capacity in Ah or mAh. For example, a rate of 1 C means utilization of all of the stored energy in one hour; a 0.1 C means utilization of 10% of the energy in one hour or full energy in 10 hours; and a 5 C means utilization of full energy in 12 minutes.

The term "ampere-hour (Ah)" refers to a unit used in specifying the storage capacity of a battery. For example, a battery with 1 Ah capacity can supply a current of one ampere for one hour or 0.5 A for two hours, etc. Therefore, 1 Ampere-hour (Ah) is the equivalent of 3600 coulombs of electrical charge. Similarly, the term "miniampere-hour (mAh)" also refers to a unit of the storage capacity of a battery and is $1/1,000$ of an ampere-hour.

The term "battery cycle life" refers to the number of complete charge/discharge cycles a battery can perform before its nominal capacity falls below 80% of its initial rated capacity.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$ wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Generally, lithium-ion battery manufacturing processes are carried out in dry rooms where the environment must be carefully controlled to preserve optimum production conditions. The dew point of the air is an indicator of the quality of the dry room. Typical dew point values for battery production range from −40° C. to −65° C. Efficiency and service life of a battery are determined in the cell production stage. Nevertheless, no prior art document describes a method for achieving an electrode assembly having a particularly low water content (e.g. less than 20 ppm).

An electrode assembly can be constructed by sequentially stacking at least one negative electrode, at least one separator, and at least one positive electrode. The number and arrangement of the at least one positive electrode, the at least one negative electrode, and the at least one separator, for configuring the electrode assembly are not particularly limited. In some embodiments, the electrode assembly has a stacked structure in which two outermost electrodes comprise an opposing polarities (i.e., a positive electrode and a negative electrode), such as a positive electrode/separator/negative electrode structure or a positive electrode/separator/negative electrode/separator/positive electrode/separator/negative electrode structure.

In certain embodiments, the electrode assembly has a stacked structure in which two outermost electrodes comprise the same polarity (i.e., positive electrodes or negative electrodes), such as a positive electrode/separator/negative electrode/separator/positive electrode structure or a negative electrode/separator/positive electrode/separator/negative electrode structure.

In some embodiments, the electrode assembly has a structure in which a separator is disposed on one of the outermost sides, such as a separator/positive electrode/separator/negative electrode structure or a positive electrode/separator/negative electrode/separator structure. In other embodiments, the electrode assembly has a structure in which separators are disposed on both the outermost sides, such as a separator/positive electrode/separator/negative electrode/separator structure.

In certain embodiments, the electrode assembly is assembled under strict humidity control in which the air has a dew point of −65° C. In some embodiments, the electrode assembly is assembled under dry conditions in which the air has a dew point of −50° C., −40° C., −30° C., −20° C., −10° C., 0° C., 5° C., or 10° C. In certain embodiments, the electrode assembly is assembled in the open air with no control of humidity.

The separator disposed between the opposing active anode and cathode surfaces can prevent contact between the anode and cathode and a short circuit of the lithium-ion battery. In some embodiments, the separator may comprise woven or nonwoven polymeric fibers, natural fibers, carbon fibers, glass fibers or ceramic fibers. In certain embodiments, the separator comprises woven or nonwoven polymeric fibers.

In some embodiments, the fibers of the nonwoven or woven are made of organic polymers, such as polyolefin, polyethylene, high-density polyethylene, linear low-density polyethylene, low-density polyethylene, ultrahigh-molecular-weight polyethylene, polypropylene, polypropylene/polyethylene co-polymer, polybutylene, polypentene, polyacetal, polyamide, polycarbonate, polyimide, polyetherether ketone, polysulfones, polyphenylene oxide, polyphenylene sulfide, polyacrylonitrile, polyvinylidene fluoride, polyoxymethylene, polyvinyl pyrrolidone, polyester, polyethylene terephthalate, polybutylene terephthalate, polyethylene naphthalene, polybutylene naphthalate, derivatives thereof, or a combination thereof. In certain embodiments, the separator is made of polyolefinic fibers selected from the group consisting of polyethylene, high-density polyethylene, linear low-density polyethylene, low-density polyethylene, ultra-high-molecular-weight polyethylene, polypropylene, polypropylene/polyethylene co-polymer, and combinations thereof. In some embodiments, the separator is made of polymeric fibers selected from the group consisting of polyester, polyacetal, polyamide, polycarbonate, polyimide, polyetherether ketone, polyether sulfone, polyphenylene oxide, polyphenylene sulfide, polyethylene naphthalene, and combinations thereof. In other embodiments, the polymeric fiber is not polyethylene, high-density polyethylene, linear low-density polyethylene, low-density polyethylene, ultra-high-molecular-weight polyethylene, polypropylene, or polypropylene/polyethylene co-polymer. In further embodiments, the polymeric fiber is not polyacetal, polyether sulfone, polyphenylene oxide, polyphenylene sulfide, or polycarbonate. In still further embodiments, polymeric fiber is not polyamide, polyimide, or polyetherether ketone. But all other known polymeric fibers and many natural fibers can be used as well.

In certain embodiments, the separator disclosed herein has a melting point of 100° C. or higher, 120° C. or higher, 140° C. or higher, 160° C. or higher, 180° C. or higher, 200° C. or higher, or 250° C. or higher. In some embodiments, the separator disclosed herein has a melting point of 140° C. or higher, 160° C. or higher, 180° C. or higher, 200° C. or higher, or 250° C. or higher. The separator having high melting point shows high thermal stability and therefore can be dried at high temperature without thermally shrinking. This also allows the drying to be more efficiently performed. Therefore, the electrode assembly can be dried in a relatively short time, resulting in a short production time.

The separator can be in a coated or uncoated form. In some embodiments, the separator has a thickness from about 10 μm to about 200 μm, from about 30 μm to about 100 μm, from about 10 μm to about 75 μm, from about 10 μm to about 50 μm, from about 10 μm to about 20 μm, from about 15 μm to about 40 μm, from about 15 μm to about 35 μm, from about 20 μm to about 40 μm, from about 20 μm to about 35 μm, from about 20 μm to about 30 μm, from about 30 μm to about 60 μm, from about 30 μm to about 50 μm, or from about 30 μm to about 40 μm.

In certain embodiments, the separator has a thickness of about 15 μm, about 20 μm, or about 25 μm. In some embodiments, the separator of the present invention has a thickness of less than 40 μm, less than 35 μm, less than 30 μm, less than 25 μm, or less than 20 μm. If the separator is sufficiently thin, the moisture may be evaporated at high drying rates.

In some embodiments, the electrode assembly is loosely stacked. In the loosely stacked electrode assembly, there is a void space between the electrode layer and separator layer, allowing moisture to escape. Therefore, the loosely stacked electrode assembly can be effectively dried in a short period of time. On the other hand, when the electrode assembly is pressed under pressure before drying, the tightly packed electrode assembly has little or no void space between the electrode layer and separator layer, thus reducing airflow and drying efficiency.

In certain embodiments, the positive electrode, separator and negative electrode are stacked and spirally wound into a jelly-roll configuration before drying. Since a roll electrode assembly is tightly packed, there is also little or no void space between the electrode layer and separator layer, thus reducing airflow and drying efficiency.

A positive electrode includes a cathode electrode layer supported on a cathode current collector. The cathode electrode layer comprises at least a cathode material and a binder material. The cathode electrode layer may further comprise a conductive agent for enhancing electron conductivity of the cathode electrode layer. A negative electrode includes an anode electrode layer supported on an anode current collector. The anode electrode layer comprises at least an anode material and a binder material. The anode electrode layer may further comprise a conductive agent for enhancing electron conductivity of the anode electrode layer.

In some embodiments, the at least one cathode comprises a cathode current collector and a cathode electrode layer comprising a cathode material, a binder material and a conductive agent, and the at least one anode comprises an anode current collector and an anode electrode layer comprising an anode material, a binder material and a conductive agent, wherein each of the cathode and anode electrode layers independently has a void volume of less than 40%, less than 37%, less than 35%, less than 33%, less than 30%, less than 25%, less than 20%, less than 18%, less than 15%, less than 13%, less than 10%, or less than 8%, based on the total volume of the cathode or anode electrode layer. In certain embodiments, the void volume of the electrode layer is between 8% and 40%, between 8% and 35%, between 8% and 30%, between 10% and 30%, between 13% and 30%, between 13% and 33%, between 15% and 30%, between 18% and 30%, between 20% and 30%, or between 25% and 30%, based on the total volume of the cathode or anode electrode layer.

If the void volume of the electrode layer is 35% or more, both the energy density and power output of the battery are low. When the void volume of the electrode layer is between 10% and 35%, the battery exhibits good diffusibility of lithium ions and high-output performance.

The current collector acts to collect electrons generated by electrochemical reactions of the active battery electrode material or to supply electrons required for the electrochemical reactions. In some embodiments, each of the cathode and anode current collectors, which can be in the form of a foil, sheet or film, is independently stainless steel, titanium, nickel, aluminum, copper or electrically-conductive resin. In certain embodiments, the cathode current collector is an aluminum thin film. In some embodiments, the anode current collector is a copper thin film.

In some embodiments, the current collector has a thickness from about 6 μm to about 100 μm. Thickness of the current collector will affect the volume occupied by the current collector within a battery and the amount of the electrode material and hence the capacity in the battery.

In certain embodiments, the thickness of each of the cathode and anode electrode layers on the current collector is independently from about 1 μm to about 300 μm, from about 10 μm to about 300 μm, from about 20 μm to about 100 μm, from about 1 μm to about 100 μm, from about 1 μm to about 50 μm, from about 1 μm to about 40 μm, from about 10 μm to about 40 μm, from about 10 μm to about 30 μm, or from about 10 μm to about 25 μm. In some embodiments, the thickness of the electrode layer on the current collector is about 10 μm, about 15 μm, about 20 μm, about 25 μm, about 30 μm, about 35 μm, or about 40 μm.

In some embodiments, the density of each of the cathode and anode electrode layers on the current collector is independently from about 1.0 g/cm$^3$ to about 6.5 g/cm$^3$, from about 1.0 g/cm$^3$ to about 5.0 g/cm$^3$, from about 1.0 g/cm$^3$ to about 4.0 g/cm$^3$, from about 1.0 g/cm$^3$ to about 3.5 g/cm$^3$, from about 1.0 g/cm$^3$ to about 3.0 g/cm$^3$, from about 1.0 g/cm$^3$ to about 2.0 g/cm$^3$, from about 2.0 g/cm$^3$ to about 5.0 g/cm$^3$, from about 2.0 g/cm$^3$ to about 4.0 g/cm$^3$, from about 3.0 g/cm$^3$ to about 5.0 g/cm$^3$, or from about 3.0 g/cm$^3$ to about 6.0 g/cm$^3$. Similarly, an increase in the density of the electrode layer will result in a reduction of void volume in the final electrode coating and a denser electrode, thereby achieving desired battery capacity.

In certain embodiments, the cathode material is selected from the group consisting of $LiCoO_2$, $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, and combinations thereof, wherein each x is independently from 0.3 to 0.8; each y is independently from 0.1 to 0.45; and each z is independently from 0 to 0.2. In certain embodiments, the cathode material is selected from the group consisting of $LiCoO_2$, $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, and combinations thereof, wherein each x is independently from 0.4 to 0.6; each y is independently from 0.2 to 0.4; and each z is independently from 0 to 0.1. In other embodiments, the cathode material is not $LiCoO_2$, $LiNiO_2$, $LiV_2O_5$, $LiTiS_2$, LiMoS$_2$, LiMnO$_2$, LiCrO$_2$, LiMn$_2$O$_4$, LiFeO$_2$, or LiFePO$_4$. In further embodiments, the cathode material is not LiNi$_x$Mn$_y$O$_2$, Li$_{1+z}$Ni$_x$Mn$_y$Co$_{1-x-y}$O$_2$, or LiNi$_x$Co$_y$Al$_z$O$_2$, wherein each x is independently from 0.3 to 0.8; each y is independently from 0.1 to 0.45; and each z is independently from 0 to 0.2.

In some embodiments, the anode material is selected from the group consisting of natural graphite particulate, synthetic graphite particulate, Sn (tin) particulate, Li$_4$Ti$_5$O$_{12}$ particulate, Si (silicon) particulate, Si—C composite particulate, and combinations thereof. In other embodiments, the anode material is not natural graphite particulate, synthetic graphite particulate, Sn (tin) particulate, Li$_4$Ti$_5$O$_{12}$ particulate, Si (silicon) particulate, or Si—C composite particulate.

In certain embodiments, the amount of each of the cathode and anode materials is independently at least 50%, at least 55%, at least 60%, at least 65%, at least 70%, at least 75%, at least 80%, at least 85%, at least 90%, or at least 95% by weight, based on the total weight of the cathode or anode electrode layer. In some embodiments, the amount of each of the cathode and anode materials is independently at most 50%, at most 55%, at most 60%, at most 65%, at most 70%, at most 75%, at most 80%, at most 85%, at most 90%, or at most 95% by weight, based on the total weight of the cathode or anode electrode layer.

In some embodiments, the conductive agent is selected from the group consisting of carbon, carbon black, graphite, expanded graphite, graphene, graphene nanoplatelets, carbon fibres, carbon nano-fibers, graphitized carbon flake, carbon tubes, carbon nanotubes, activated carbon, mesoporous carbon, and combinations thereof. In certain embodiments, the conductive agent is not carbon, carbon black, graphite, expanded graphite, graphene, graphene nanoplatelets, carbon fibres, carbon nano-fibers, graphitized carbon flake, carbon tubes, carbon nanotubes, activated carbon, or mesoporous carbon.

In certain embodiments, the amount of the conductive agent in each of the cathode and anode electrode layers is independently at least 1%, at least 2%, at least 3%, at least 4%, at least 5%, at least 10%, at least 15%, at least 20%, at least 25%, at least 30%, at least 35%, at least 40%, at least 45%, or at least 50% by weight, based on the total weight of the cathode or anode electrode layer. In some embodiments, the amount of the conductive agent in each of the cathode and anode electrode layers is independently at most 1%, at most 2%, at most 3%, at most 4%, at most 5%, at most 10%, at most 15%, at most 20%, at most 25%, at most 30%, at most 35%, at most 40%, at most 45%, or at most 50% by weight, based on the total weight of the cathode or anode electrode layer.

In some embodiments, the amount of the conductive agent in each of the cathode and anode electrode layers is independently from about 0.05 wt. % to about 0.5 wt. %, from about 0.1 wt. % to about 1 wt. %, from about 0.25 wt. % to about 2.5 wt. %, from about 0.5 wt. % to about 5 wt. %, from about 2 wt. % to about 5 wt. %, from about 3 wt. % to about 7 wt. %, or from about 5 wt. % to about 10 wt. %, based on the total weight of the cathode or anode electrode layer.

After assembling the electrode assembly, the electrode assembly is placed into a drying chamber. In some embodiments, the drying chamber is connected to a vacuum pump, so that the pressure in the chamber can be reduced. The pressure is reduced sufficiently so as to lower the boiling point of water. The drying time can therefore be considerably reduced. In certain embodiments, the drying chamber is connected to a central vacuum supply, thereby allowing several vacuum drying ovens to be operated simultaneously. In some embodiments, the number of vacuum drying ovens connected to a central vacuum supply ranges from 1 to 20 depending on the number of pumps operated. In certain embodiments, a vacuum pump or central vacuum supply is connected to the drying chamber by a suction line equipped with a gas outlet valve. In some embodiments, the drying chamber is also connected to a gas reservoir containing dry air or inert gas by a duct equipped with a gas inlet valve. When the gas outlet valve is closed and the gas inlet valve is opened, vacuum is lost in the drying chamber. The valve might be of a solenoid or needle type or a mass flow controller. Any devices allowing an appropriate flow adjustment might be used.

To reduce the power required for the pumps, a condenser can be provided between the drying chamber and the pump. The condenser condenses out water vapor, which is then separated.

In certain embodiments, the electrode assembly can be dried under vacuum at a temperature from about 70° C. to about 155° C., from about 80° C. to about 155° C., from about 90° C. to about 155° C., from about 100° C. to about 155° C., from about 100° C. to about 140° C., from about 100° C. to about 130° C., from about 100° C. to about 120° C., from about 100° C. to about 110° C., or from about 110° C. to about 130° C. In certain embodiments, the electrode assembly can be dried under vacuum at a temperature from about 80° C. to about 155° C. In some embodiments, the electrode assembly can be dried under vacuum at a temperature of about 80° C. or higher, 90° C. or higher, 100° C. or higher, 110° C. or higher, 120° C. or higher, 130° C. or higher, 140° C. or higher, or 150° C. or higher. In certain embodiments, the electrode assembly can be dried under vacuum at a temperature of less than 155° C., less than 150° C., less than 145° C., less than 140° C., less than 135° C., less than 130° C., less than 125° C., less than 120° C., less than 115° C., less than 110° C., less than 105° C., less than 100° C., or less than 90° C.

In some embodiments, the time period for drying the electrode assembly under vacuum is from about 5 minutes to about 12 hours, from about 5 minutes to about 4 hours, from about 5 minutes to about 2 hours, from about 5 minutes to about 1 hour, from about 5 minutes to about 30 minutes, from about 5 minutes to about 15 minutes, from about 15 minutes to about 1 hour, from about 15 minutes to about 3 hours, from about 1 hour to about 10 hours, from about 1 hour to about 8 hours, from about 1 hour to about 6 hours, from about 1 hour to about 4 hours, from about 1 hour to about 2 hours, from about 2 hours to about 12 hours, from about 2 hours to about 8 hours, from about 2 hours to about 5 hours, from about 2 hours to about 3 hours, or from about 4 hours to about 12 hours. In some embodiments, the time period for drying the electrode assembly under vacuum is from about 5 minutes to about 2 hours, or from about 15 minutes to about 30 minutes.

Any vacuum pumps that can reduce the pressure of the drying chamber can be used herein. Some non-limiting examples of the vacuum pumps include dry vacuum pumps, turbo pumps, rotary vane vacuum pumps, cryogenic pumps, and sorption pumps.

In some embodiments, the vacuum pump is an oil free pump. The oil free pump operates without the need for oil in the pump parts which are exposed to gases being pumped, or partial vacuum. Thus, any gases backstreaming through the pump are free from oil vapour. Progressive oil vapour deposited on surfaces of the electrode assembly may reduce the electrochemical performance of a battery. An example of such pump is a diaphragm vacuum pump.

In certain embodiments, high vacuum can be achieved by using a two-stage pumping system to evacuate the drying chamber. The pumping system comprises a primary vacuum pump such as a rotary pump or diaphragm pump arranged in series with a high vacuum pump such as a turbo-molecular pump.

In some embodiments, the electrode assembly is dried under atmospheric pressure. In certain embodiments, the drying is performed in a vacuum state. In further embodiments, the vacuum state is maintained at a pressure within the range from about $1 \times 10^{-1}$ Pa to about $1 \times 10^{-4}$ Pa, from about 10 Pa to about $1 \times 10^{-1}$ Pa, from about $1 \times 10^{3}$ Pa to about 10 Pa, or from about $2.5 \times 10^{4}$ Pa to about $1 \times 10^{3}$ Pa. In still further embodiments, the vacuum state is at a pressure of about $1 \times 10^{3}$ Pa, about $2 \times 10^{3}$ Pa, about $5 \times 10^{3}$ Pa, about $1 \times 10^{4}$ Pa, or about $2 \times 10^{4}$ Pa.

After a predetermined drying time period, the drying chamber vents directly to a gas reservoir containing dry air or inert gas via a gas inlet valve. In some embodiments, the gas reservoir is a nitrogen gas cylinder. In certain embodiments, the inert gas is selected from the group consisting of helium, argon, neon, krypton, xenon, nitrogen, carbon dioxide, and combinations thereof. In some embodiments, the water content of the dry air or inert gas is maintained less than or equal to 10 ppm, less than or equal to 8 ppm, less than or equal to 5 ppm, less than or equal to 4 ppm, less than or equal to 3 ppm, less than or equal to 2 ppm, or less than or equal to 1 ppm.

In some embodiments, the dry air or inert gas is preheated before entering the drying chamber. In certain embodiments, the temperature of the dry air or inert gas is from about 70° C. to about 130° C., from about 70° C. to about 110° C., from about 70° C. to about 100° C., from about 70° C. to about 90° C., from about 70° C. to about 80° C., from about 80° C. to about 155° C., from about 80° C. to about 120° C., from about 80° C. to about 100° C., from about 90° C. to about 155° C., from about 90° C. to about 130° C., from about 90° C. to about 100° C., from about 70° C. to about 155° C., from about 100° C. to about 130° C., or from about 100° C. to about 120° C. In some embodiments, the dry air or inert gas is preheated to a temperature from about 70° C. to about 155° C. before entering the drying chamber.

In certain embodiments, the dry air or inert gas stays in the drying chamber for a time period from about 30 seconds to about 2 hours, from about 1 minute to about 1 hour, from about 5 minutes to about 30 minutes, from about 5 minutes to about 15 minutes, from about 5 minutes to about 10 minutes, from about 10 minutes to about 30 minutes, from about 10 minutes to about 20 minutes, from about 10 minutes to about 15 minutes, from about 15 minutes to about 1 hour, from about 15 minutes to about 30 minutes, from about 15 minutes to about 20 minutes, or from about 30 minutes to about 1 hour. In some embodiments, the dry air or inert gas stays in the drying chamber for a time period from about 30 seconds to about 2 hours, from about 5 minutes to about 2 hours, or from about 15 minutes to about 30 minutes.

In some embodiments, the electrode assembly can be further dried under vacuum after incubating the electrode assembly with the dry gas for a predetermined time. This procedure can be repeated as many times as required to reduce the moisture content of the electrode assembly to an appropriate level. In certain embodiments, this procedure can be repeated around 2 to 50 times until the moisture content in the electrode assembly is less than 40 ppm, less than 30 ppm, less than 20 ppm, less than 15 ppm, less than 10 ppm, or less than 5 ppm, based on the total weight of the dried electrode assembly.

In certain embodiments, the steps of vacuum drying and gas filling can be repeated at least 2 times, at least 3 times, at least 4 times, at least 5 times, at least 6 times, at least 7 times, at least 8 times, at least 9 times, at least 10 times, at least 12 times, at least 14 times, at least 16 times, at least 18 times, at least 20 times, at least 22 times, at least 24 times, at least 26 times, at least 28 times, or at least 30 times. In some embodiments, the steps of vacuum drying and gas filling can be repeated between 2 and 50 times, between 2 and 30 times, between 2 and 20 times, between 2 and 10 times, between 5 and 30 times, between 5 and 20 times, or between 2 and 10 times. In certain embodiments, the steps of vacuum drying and gas filling can be repeated between 2 or more times.

In some embodiments, the process for drying the electrode assembly comprises vacuum drying, followed by hot air drying. In some embodiments, the drying chamber blows hot air toward the electrode assembly from above and/or underneath. In certain embodiments, the hot air drying is performed at an air velocity from about 1 meter/second to about 50 meter/second, from about 1 meter/second to about 40 meter/second, from about 1 meter/second to about 30 meter/second, from about 1 meter/second to about 20 meter/second, from about 1 meter/second to about 10 meter/second, from about 10 meter/second to about 50 meter/second, from about 10 meter/second to about 40 meter/second, from about 10 meter/second to about 30 meter/second, from about 10 meter/second to about 20 meter/second, from about 20 meter/second to about 30 meter/second, from about 30 meter/second to about 40 meter/second, or from 40 meter/second to about 50 meter/second. In other embodiments, a heated inert gas (i.e., helium, argon) is used instead of heated air.

The drying gas might be preheated through heat exchange surfaces. In some embodiments, the temperature of the hot air ranges from about 50° C. to about 155° C., from about 60° C. to about 150° C., from about 80° C. to about 150° C., from about 100° C. to about 150° C., from about 70° C. to about 150° C., from about 70° C. to about 130° C., from about 70° C. to about 100° C., from about 80° C. to about 150° C., from about 80° C. to about 130° C., from about 80° C. to about 110° C., from about 100° C. to about 140° C., or from about 100° C. to about 120° C.

In certain embodiments, the time period for hot air drying is from about 1 minute to about 2 hours, from about 1 minute to about 1 hour, from about 1 minute to about 30 minutes, from about 1 minute to about 15 minutes, from about 5 minutes to about 30 minutes, from about 5 minutes to about 20 minutes, from about 1 minute to about 15 minutes, from about 5 minutes to about 10 minutes, from about 10 minutes to about 1 hour, from about 10 minutes to about 30 minutes, from about 10 minutes to about 20 minutes, from about 15 minutes to about 1 hour, or from about 15 minutes to about 30 minutes.

In some embodiments, the electrode assembly can be further dried under vacuum after blowing hot air for a predetermined time. This procedure can be repeated as many times as required to reduce the moisture content of the electrode assembly to an appropriate level, such as 40 ppm, 30 ppm, 20 ppm, 15 ppm, 10 ppm, or 5 ppm.

Currently, water is the key factor needed to be strictly controlled in the organic-based production process of lithium-ion batteries. A battery with high water content may lead to serious attenuation of electrochemical performance and affect stability of battery.

The advantages of the present invention is that most of the fabrication can take place outside a dry room. In some embodiments, the assembling process can take place outside a dry room or a glove box. In certain embodiments, only the step for filling electrolyte or both the steps for drying the electrode assembly and filing electrolyte are carried out in a dry room or a glove box. Thus, humidity control in the factory can be avoided, significantly lowering the investment cost.

The presence of moisture is detrimental to the operation of a battery. Generally, water content in the electrode assembly prepared by conventional methods contains an amount of water greater than 100 ppm by weight, based on the total weight of the electrode assembly. Even if the initial battery performance is acceptable, the rate of deterioration of the battery performance may be unacceptable. To be able to achieve sufficiently high battery performance, it would therefore be advantageous to have a low water content in the battery.

The electrode assembly prepared by the method disclosed herein has a particularly low water content, contributing to reliable performance of the lithium-ion batteries. In some embodiments, the water content in the dried electrode assembly is from about 5 ppm to about 50 ppm, from about 5 ppm to about 40 ppm, from about 5 ppm to about 30 ppm, from about 5 ppm to about 20 ppm, from about 5 ppm to about 10 ppm, from about 3 ppm to about 30 ppm, from about 3 ppm to about 20 ppm, or from about 3 ppm to about 10 ppm by weight, based on the total weight of the dried electrode assembly.

In certain embodiments, the water content in the dried electrode assembly is less than 50 ppm, less than 40 ppm, less than 30 ppm, less than 20 ppm, less than 10 ppm, less than 5 ppm, less than 4 ppm, less than 3 ppm, less than 2 ppm, or less than 1 ppm by weight, based on the total weight of the dried electrode assembly. In some embodiments, the dried electrode assembly disclosed herein has a water concentration therein no greater than about 5 ppm by weight, based on the total weight of the dried electrode assembly.

In some embodiments, the dried electrode assembly comprises at least one dried anode and at least one dried cathode, wherein the at least one dried anode and at least one dried cathode have a water content of less than 50 ppm, less than 40 ppm, less than 30 ppm, less than 20 ppm, less than 10 ppm, or less than 5 ppm by weight, based on the total weight of the at least one dried anode and at least one dried cathode.

In certain embodiments, the dried electrode assembly comprises at least one dried separator, wherein the at least one dried separator has a water content of less than 50 ppm, less than 40 ppm, less than 30 ppm, less than 20 ppm, less than 10 ppm, or less than 5 ppm by weight, based on the total weight of the at least one dried separator.

After the drying step, the electrode assembly can then be naturally cooled to 50° C. or less before being removed from the drying chamber. In some embodiments, the electrode assembly is cooled to 45° C. or less, 40° C. or less, 35° C. or less, 30° C. or less, or 25° C. or less before being removed from the drying chamber. In certain embodiments, the electrode assembly is cooled to room temperature. In certain embodiments, the electrode assembly is cooled down by blowing a dry gas or inert gas in order to reach the target temperature more quickly.

The binder material in the electrode layer performs a role of binding the electrode material and conductive agent together on the current collector. In certain embodiments, each of the at least one anode and at least one cathode independently comprises a binder material selected from the group consisting of an organic-based binder material, a water-based binder material and a mixture of water-based and organic-based binder materials.

In some embodiments, each of the binder materials in the cathode and anode electrode layers is independently selected from the group consisting of styrene-butadiene rubber, acrylated styrene-butadiene rubber, acrylonitrile copolymer, acrylonitrile-butadiene rubber, nitrile butadiene rubber, acrylonitrile-styrene-butadiene copolymer, acryl rubber, butyl rubber, fluorine rubber, polytetrafluoroethylene, polyethylene, polypropylene, ethylene/propylene copolymers, polybutadiene, polyethylene oxide, chlorosulfonated polyethylene, polyvinylpyrrolidone, polyvinylpyridine, polyvinyl alcohol, polyvinyl acetate, polyepichlorohydrin, polyphosphazene, polyacrylonitrile, polystyrene, latex, acrylic resins, phenolic resins, epoxy resins, carboxymethyl cellulose, hydroxypropyl cellulose, cellulose acetate, cellulose acetate butyrate, cellulose acetate propionate, cyanoethylcellulose, cyanoethylsucrose, polyester, polyamide, polyether, polyimide, polycarboxylate, polycarboxylic acid, polyacrylic acid, polyacrylate, polymethacrylic acid, polymethacrylate, polyacrylamide, polyurethane, fluorinated polymer, chlorinated polymer, a salt of alginic acid, polyvinylidene fluoride, poly(vinylidene fluoride)-hexafluoropropene, and combinations thereof. In further embodiments, the salt of alginic acid comprises a cation selected from Na, Li, K, Ca, $NH_4$, Mg, Al, or a combination thereof.

In certain embodiments, each of the binder materials in the cathode and anode electrode layers is independently selected from the group consisting of styrene-butadiene rubber, carboxymethyl cellulose, polyvinylidene fluoride, acrylonitrile copolymer, polyacrylic acid, polyacrylonitrile, poly(vinylidene fluoride)-hexafluoropropene, latex, a salt of alginic acid, and combinations thereof.

In some embodiments, each of the binder materials in the cathode and anode electrode layers is independently selected from SBR, CMC, PAA, a salt of alginic acid, or a combination thereof. In certain embodiments, each of the binder materials in the cathode and anode electrode layers is independently acrylonitrile copolymer. In some embodiments, each of the binder materials in the cathode and anode electrode layers is independently polyacrylonitrile. In certain embodiments, each of the binder materials in the cathode and anode electrode layers independently is free of styrene-butadiene rubber, carboxymethyl cellulose, polyvinylidene fluoride, acrylonitrile copolymer, polyacrylic acid, polyacrylonitrile, poly(vinylidene fluoride)-hexafluoropropene, latex, or a salt of alginic acid.

In certain embodiments, the amount of the binder material in each of the cathode and anode electrode layers is independently at least 1%, at least 2%, at least 3%, at least 4%, at least 5%, at least 10%, at least 15%, at least 20%, at least 25%, at least 30%, at least 35%, at least 40%, at least 45%, or at least 50% by weight, based on the total weight of the cathode or anode electrode layer. In some embodiments, the amount of the binder material in each of the cathode and anode electrode layers is independently at most 1%, at most 2%, at most 3%, at most 4%, at most 5%, at most 10%, at most 15%, at most 20%, at most 25%, at most 30%, at most 35%, at most 40%, at most 45%, or at most 50% by weight, based on the total weight of the cathode or anode electrode layer.

In some embodiments, the amount of the binder material in each of the cathode and anode electrode layers is independently is from about 2 wt. % to about 10 wt. %, from about 3 wt. % to about 6 wt. %, from about 5 wt. % to about 10 wt. %, from about 7.5 wt. % to about 15 wt. %, from about 10 wt. % to about 20 wt. %, from about 15 wt. % to about 25 wt. %, from about 20 wt. % to about 40 wt. %, or from about 35 wt. % to about 50 wt. %, based on the total weight of the cathode or anode electrode layer.

In order to prevent moisture from being present within the sealed container, the step of filling electrolyte is carried out in a dry room. After drying, the electrode assembly is placed inside a container and then an electrolyte is added to fill the pores of all of the layers of separator and electrodes, and each of the gaps between the positive and negative electrodes and the separator in the electrode assembly under an inert atmosphere before sealing.

The method disclosed herein reduces the production costs of lithium-ion batteries by consuming less energy and shortens manufacturing times needed for drying. Therefore, this method is especially suited for industrial processes because of its low cost and ease of handling.

Also provided herein is a lithium battery comprising the electrode assembly prepared by the method disclosed herein.

The following examples are presented to exemplify embodiments of the invention. All numerical values are approximate. When numerical ranges are given, it should be understood that embodiments outside the stated ranges may still fall within the scope of the invention. Specific details described in each example should not be construed as necessary features of the invention.

EXAMPLES

The water content in the electrode assembly was measured by Karl-fisher titration. The electrode assembly was cut into small pieces of 1 cm×1 cm in a glove box filled with argon gas. The cut electrode assembly having a size of 1 cm×1 cm was weighed in a sample vial. The weighed electrode assembly was then added into a titration vessel for Karl Fischer titration using Karl Fischer coulometry moisture analyzer (831 KF Coulometer, Metrohm, Switzerland). Measurement was repeated three times to find the average value.

The water content in the electrodes or separator was measured by Karl-fisher titration. The electrode assembly was cut into small pieces of 1 cm×1 cm in a glove box filled with argon gas. The electrode assembly was separated into the anode, cathode and separator layers. The water contents of the separated electrode layers and separator layers were analysed separately by Karl Fischer titration. Measurement was repeated three times to find the average value.

Example 1

A) Preparation of Positive Electrode Slurry

A positive electrode slurry was prepared by mixing 94 wt. % cathode material (LNMC TLM 310, obtained from Xinxiang Tianli Energy Co. Ltd., China), 3 wt. % carbon black (SuperP; obtained from Timcal Ltd, Bodio, Switzerland) as a conductive agent, and 0.8 wt. % polyacrylic acid (PAA, #181285, obtained from Sigma-Aldrich, US), 1.5 wt. % styrene butadiene rubber (SBR, AL-2001, obtained from NIPPON A&L INC., Japan) and 0.7 wt. % polyvinylidene fluoride (PVDF; Solef® 5130, obtained from Solvay S.A., Belgium) as a binder, which were dispersed in deionized water to form a slurry with a solid content of 50 wt. %. The slurry was homogenized by a planetary stirring mixer.

B) Preparation of Positive Electrode

The homogenized slurry was coated onto both sides of an aluminum foil having a thickness of 20 μm using a transfer coater (ZY-TSF6-6518, obtained from Jin Fan Zhanyu New Energy Technology Co. Ltd., China) with an area density of about 26 mg/cm$^2$. The coated films on the aluminum foil were dried for 3 minutes by a 24-meter-long conveyor hot air drying oven as a sub-module of the transfer coater operated at a conveyor speed of about 8 meters/minute to obtain a positive electrode. The temperature-programmed oven allowed a controllable temperature gradient in which the temperature gradually rose from the inlet temperature of 60° C. to the outlet temperature of 75° C. The electrode was then pressed to increase the density of the coating and the density was 3.36 g/cm$^3$. The void volume of the electrode layer is 16%.

C) Preparation of Negative Electrode

A negative electrode slurry was prepared by mixing 90 wt. % hard carbon (HC; 99.5% purity, Ruifute Technology Ltd., Shenzhen, Guangdong, China), 5 wt. % carbon black and 5 wt. % polyacrylonitrile in deionized water to form a slurry having a solid content of 50 wt. %. The slurry was coated onto both sides of a copper foil having a thickness of 9 μm using a transfer coater with an area density of about 15 mg/cm$^2$. The coated films on the copper foil were dried at about 50° C. for 2.4 minute by a 24-meter-long conveyor hot air dryer operated at a conveyor speed of about 10 meters/minute to obtain a negative electrode. The electrode was then pressed to increase the density of the coating and the density was 1.78 g/cm$^3$. The void volume of the electrode layer is 19%.

Example 2

Assembling of Electrode Assembly

The resulting cathode film and anode film of Example 1 were used to prepare the cathode and anode respectively by cutting into individual electrode plates. An electrode assembly was prepared by stacking anodes, cathodes and separators interposed between the positive electrode and the negative electrode in the open air with no control of humidity. The separator was a microporous membrane made of non-woven PET fabric (obtained from MITSUBISHI PAPER MILLS LTD, Japan), which had a thickness of 30 μm. The electrode assembly was dried in a vacuum oven inside a glove box under a pressure of 5×10$^3$ Pa at 100° C. for 2 hours. The drying chamber was then filled with hot, dry air having a water content of 5 ppm and a temperature of 90° C. The hot, dry air was retained in the drying chamber for 15 minutes before evacuating the drying chamber. This cycle was repeated 10 times.

Moisture Contents of Electrode Assembly, Electrodes and Separator

The average values of moisture contents of the electrode assembly, electrodes and separator were 19 ppm, 9 ppm and 15 ppm respectively.

Assembling of Pouch-Type Battery

A pouch cell was assembled by packaging the dried electrode assembly in a case made of an aluminum-plastic laminated film. The cathode and anode electrode plates were kept apart by separators and the case was pre-formed. An electrolyte was then filled into the case holding the packed electrodes in high-purity argon atmosphere with moisture and oxygen content <1 ppm. The electrolyte was a solution of LiPF$_6$ (1 M) in a mixture of ethylene carbonate (EC), ethyl methyl carbonate (EMC) and dimethyl carbonate (DMC) in a volume ratio of 1:1:1. After electrolyte filling, the pouch cells were vacuum sealed and then mechanically pressed using a punch tooling with standard square shape.

Electrochemical Measurements of Example 2

I) Nominal Capacity

The cell was tested galvanostatically at a current density of C/2 at 25° C. on a battery tester (BTS-5V20A, obtained from Neware Electronics Co. Ltd, China) between 3.0 V and 4.2 V. The nominal capacity was about 2.6 Ah.

II) Cyclability Performance

The cyclability performance of the pouch cell was tested by charging and discharging at a constant current rate of 1 C between 3.0 V and 4.2 V. Test result of cyclability performance is shown in FIG. 1. The capacity retention after 486 cycles was about 94.7% of the initial value. The electrochemical tests show good electrochemical stability of the battery in a wide range of potential, as well as outstanding cycle performance.

Example 3

A) Preparation of Positive Electrode Slurry

A positive electrode slurry was prepared by mixing 92 wt. % cathode material ($LiMn_2O_4$ obtained from HuaGuan HengYuan LiTech Co. Ltd., Qingdao, China), 4 wt. % carbon black (SuperP; obtained from Timcal Ltd, Bodio, Switzerland) as a conductive agent, and 4 wt. % polyvinylidene fluoride (PVDF; Solef® 5130, obtained from Solvay S.A., Belgium) as a binder, which were dispersed in N-methyl-2-pyrrolidone (NMP; purity of ≥99%, Sigma-Aldrich, USA) to form a slurry with a solid content of 50 wt. %. The slurry was homogenized by a planetary stirring mixer.

B) Preparation of Positive Electrode

The homogenized slurry was coated onto both sides of an aluminum foil having a thickness of 20 μm using a transfer coater with an area density of about 40 mg/cm². The coated films on the aluminum foil were dried for 6 minutes by a 24-meter-long conveyor hot air drying oven as a sub-module of the transfer coater operated at a conveyor speed of about 4 meters/minute to obtain a positive electrode. The temperature-programmed oven allowed a controllable temperature gradient in which the temperature gradually rose from the inlet temperature of 65° C. to the outlet temperature of 80° C. The electrode was then pressed to increase the density of the coating and the density was 3.01 g/cm³. The void volume of the electrode layer is 25%.

C) Preparation of Negative Electrode

A negative electrode slurry was prepared by mixing 90 wt. % of hard carbon (HC; purity of 99.5%, obtained from Ruifute Technology Ltd., Shenzhen, Guangdong, China) with 1.5 wt. % carboxymethyl cellulose (CMC, BSH-12, DKS Co. Ltd., Japan) and 3.5 wt. % SBR (AL-2001, NIPPON A&L INC., Japan) as a binder, and 5 wt. % carbon black as a conductive agent, which were dispersed in deionized water to form another slurry with a solid content of 50 wt. %. The slurry was coated onto both sides of a copper foil having a thickness of 9 μm using a transfer coater with an area density of about 15 mg/cm². The coated films on the copper foil were dried at about 50° C. for 2.4 minutes by a 24-meter-long conveyor hot air dryer operated at a conveyor speed of about 10 meters/minute to obtain a negative electrode. The electrode was then pressed to increase the density of the coating and the density was 1.78 g/cm³. The void volume of the electrode layer is 19%.

Example 4

Assembling of Electrode Assembly

The resulting cathode film and anode film of Example 3 were used to prepare the cathode and anode respectively by cutting into individual electrode plates. An electrode assembly was prepared by stacking anodes, cathodes and separators interposed between the positive electrode and the negative electrode in the open air with no control of humidity. The separator was a ceramic coated microporous membrane made of nonwoven fabric (SEPARION, Evonik Industries, Germany), which had a thickness of about 35 μm. The electrode assembly was dried in a vacuum oven inside a glove box under a pressure of 10×10³ Pa at 102° C. for 3 hours. The drying chamber was then filled with hot, dry nitrogen having a water content of 5 ppm and a temperature of 85° C. The hot, dry air was retained in the drying chamber for 5 minutes before evacuating the drying chamber. This cycle was repeated 10 times.

Moisture Contents of Electrode Assembly, Electrodes and Separator

The average values of moisture contents of the electrode assembly, electrodes and separator were 33 ppm, 12 ppm and 26 ppm respectively.

Electrochemical Measurements of Example 4

I) Nominal Capacity

A pouch cell containing the dried electrode assembly prepared by method described in Example 4 was assembled according to the method described in Example 2. The cell was tested galvanostatically at a current density of C/2 at 25° C. on a battery tester between 3.0 V and 4.2 V. The nominal capacity was about 9.3 Ah.

II) Cyclability Performance

Figure 2:
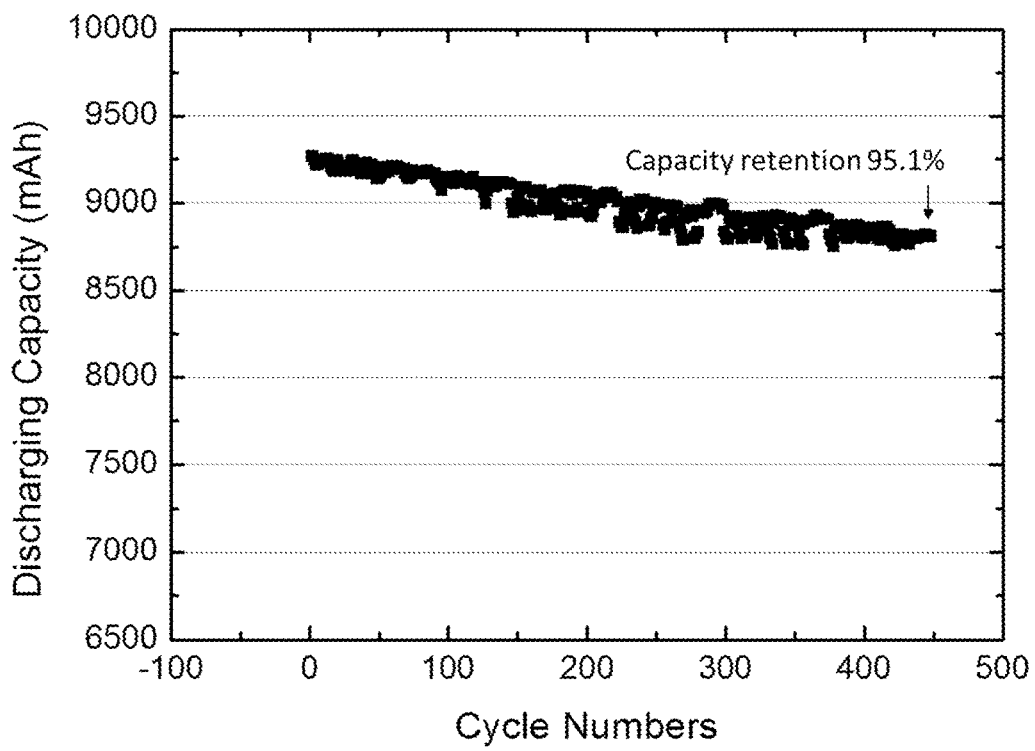
FIG. 2 depicts cycling performance of an electrochemical cell containing an electrode assembly prepared by the method described in Example 4.

The cyclability performance of the pouch cell was tested by charging and discharging at a constant current rate of 1 C between 3.0 V and 4.2 V. Test result of cyclability performance is shown in FIG. 2. The capacity retention after 448 cycles was about 95.1% of the initial value. The electrochemical tests show the good electrochemical stability of the battery in a wide range of potential, as well as outstanding cycle performance.

Example 5

A) Preparation of Positive Electrode Slurry

A positive electrode slurry was prepared by mixing 94 wt. % cathode material $LiNi_{0.33}Mn_{0.33}Co_{0.33}O_2$ (obtained from Shenzhen Tianjiao Technology Co. Ltd., China), 3 wt. % carbon black (SuperP; obtained from Timcal Ltd, Bodio, Switzerland) as a conductive agent, and 1.5 wt. % polyacrylic acid (PAA, #181285, obtained from Sigma-Aldrich, US) and 1.5 wt. % polyacrylonitrile (LA 132, Chengdu Indigo Power Sources Co., Ltd., China) as a binder, which were dispersed in deionized water to form a slurry with a solid content of 50 wt. %. The slurry was homogenized by a planetary stirring mixer.

B) Preparation of Positive Electrode

The homogenized slurry was coated onto both sides of an aluminum foil having a thickness of 20 μm using a transfer coater with an area density of about 32 mg/cm². The coated films on the aluminum foil were dried for 4 minutes by a 24-meter-long conveyor hot air drying oven as a sub-module of the transfer coater operated at a conveyor speed of about 6 meters/minute to obtain a positive electrode. The temperature-programmed oven allowed a controllable temperature gradient in which the temperature gradually rose from the inlet temperature of 60° C. to the outlet temperature of 75°

C. The electrode was then pressed to increase the density of the coating and the density was 2.65 g/cm³. The void volume of the electrode layer is 34%.

C) Preparation of Negative Electrode

A negative electrode slurry was prepared by mixing 90 wt. % hard carbon, 5 wt. % carbon black and 5 wt. % polyacrylonitrile in deionized water to form a slurry having a solid content of 50 wt. %. The slurry was coated onto both sides of a copper foil having a thickness of 9 μm using a transfer coater with an area density of about 15 mg/cm². The coated films on the copper foil were dried at about 50° C. for 2.4 minutes by a 24-meter-long conveyor hot air dryer operated at a conveyor speed of about 10 meters/minute to obtain a negative electrode. The electrode was then pressed to increase the density of the coating and the density was 1.78 g/cm³. The void volume of the electrode layer is 19%.

Example 6

Assembling of Electrode Assembly

The resulting cathode film and anode film of Example 5 were used to prepare the cathode and anode respectively by cutting into individual electrode plates. An electrode assembly was prepared by stacking anodes, cathodes and separators interposed between the positive electrode and the negative electrode in the open air with no control of humidity. The separator was a microporous membrane made of polyimide (Jiangxi Advanced Nanofiber Technology Co., Ltd., China) having a thickness of 20 μm. The electrode assembly was dried in a vacuum oven inside a glove box under a pressure of 1×10³ Pa at 110° C. for 2 hours. The drying chamber was then filled with hot, dry air having a water content of 5 ppm and a temperature of 100° C. The hot, dry air was retained in the drying chamber for 10 minutes before evacuating the drying chamber. This cycle was repeated 10 times.

Moisture Content of Electrode Assembly

The average value of moisture content of the electrode assembly was 16 ppm.

Electrochemical Measurements of Example 6

I) Nominal Capacity

A pouch cell containing the dried electrode assembly prepared by method described in Example 6 was assembled according to the method described in Example 2. The cell was tested galvanostatically at a current density of C/2 at 25° C. on a battery tester between 3.0 V and 4.2 V. The nominal capacity was about 8.5 Ah.

II) Cyclability Performance

Figure 3:
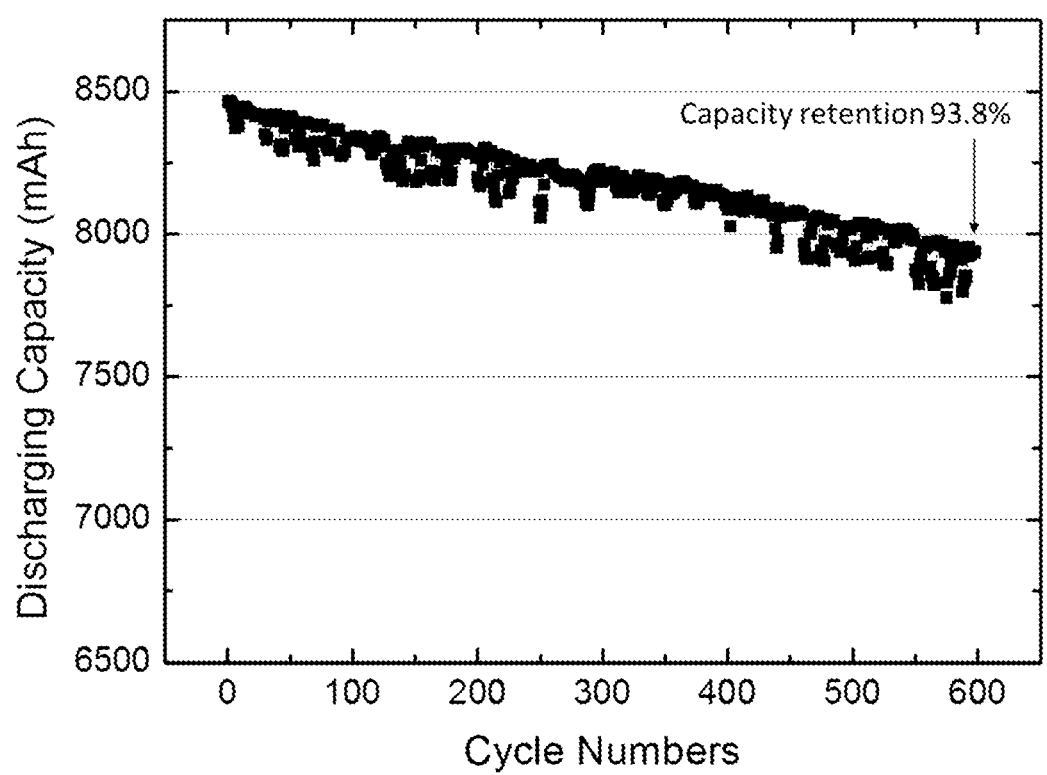
FIG. 3 depicts cycling performance of an electrochemical cell containing an electrode assembly prepared by the method described in Example 6.

The cyclability performance of the pouch cell was tested by charging and discharging at a constant current rate of 1 C between 3.0 V and 4.2 V. Test result of cyclability performance is shown in FIG. 3. The capacity retention after 598 cycles was about 93.8% of the initial value. The electrochemical tests show the good electrochemical stability of the battery in a wide range of potential, as well as outstanding cycle performance.

While the invention has been described with respect to a limited number of embodiments, the specific features of one embodiment should not be attributed to other embodiments of the invention. Variations and modifications from the described embodiments exist. The appended claims intend to cover all those modifications and variations as falling within the scope of the invention.

What is claimed is:

1. An electrode assembly for a lithium-ion battery, comprising at least one anode, at least one cathode and at least one separator interposed between the at least one anode and the at least one cathode, wherein the at least one anode comprises an anode current collector and an anode electrode layer comprising an anode material and a binder material, and the at least one cathode comprises a cathode current collector and a cathode electrode layer comprising a cathode material and a binder material;

wherein each of the cathode and anode electrode layers independently has a void volume between 10% and 35%, based on the total volume of the electrode layer;

wherein the amount of each of the binder materials is independently at least 3% by weight, based on the total weight of the electrode layer;

wherein the at least one separator is made of polymeric fibers selected from the group consisting of polyamide, polycarbonate, polyimide, polyetherether ketone, polysulfones, polyphenylene oxide, polyphenylene sulfide, polyacrylonitrile, polyvinyl pyrrolidone, polyester, polyethylene terephthalate, polybutylene terephthalate, polyethylene naphthalene, polybutylene naphthalate, and combinations thereof;

wherein the cathode electrode layer and the anode electrode layer each further comprises only one conductive agent independently selected from the group consisting of carbon, carbon black, graphite, expanded graphite, graphene, graphene nanoplatelets, carbon fibers, carbon nano-fibers, graphitized carbon flake, carbon tubes, carbon nanotubes, activated carbon and mesoporous carbon;

wherein the density of each of the cathode and anode electrode layers is independently from 1.0 g/cm³ to 6.5 g/cm³;

wherein each of the binder materials is independently selected from the group consisting of styrene-butadiene rubber, acrylated styrene-butadiene rubber, acrylonitrile copolymer, acrylonitrile-butadiene rubber, nitrile butadiene rubber, acrylonitrile-styrene-butadiene copolymer, acryl rubber, butyl rubber, fluorine rubber, polytetrafluoroethylene, polyethylene, polypropylene, ethylene/propylene copolymers, polybutadiene, polyethylene oxide, chlorosulfonated polyethylene, polyvinylpyrrolidone, polyvinylpyridine, polyvinyl alcohol, polyvinyl acetate, polyepichlorohydrin, polyphosphazene, polyacrylonitrile, polystyrene, latex, acrylic resins, phenolic resins, epoxy resins, carboxymethyl cellulose, hydroxypropyl cellulose, cellulose acetate, cellulose acetate butyrate, cellulose acetate propionate, cyanoethylcellulose, cyanoethylsucrose, polyester, polyamide, polyether, polyimide, polycarboxylate, polycarboxylic acid, polyacrylic acid, polyacrylate, polymethacrylic acid, polymethacrylate, polyacrylamide, polyurethane, fluorinated polymer, chlorinated polymer, a salt of alginic acid, polyvinylidene fluoride, poly(vinylidene fluoride)-hexafluoropropene, and combinations thereof;

wherein the water content of the electrode assembly is less than 50 ppm by weight, based on the total weight of the electrode assembly; and wherein the at least one separator comprises a coating and the thickness of the coated separator is less than 40 μm.

2. The electrode assembly of claim 1, wherein the density of each of the cathode and anode electrode layers is independently from 1.0 g/cm³ to 3.0 g/cm³.

3. The electrode assembly of claim 1, wherein the thickness of each of the cathode and anode electrode layers is independently from 1.0 μm to 40 μm.

4. The electrode assembly of claim 1, wherein the thickness of each of the cathode and anode electrode layers is independently from 1.0 μm to 25 μm.

5. The electrode assembly of claim 1, wherein the thickness of the separator is from about 1.0 μm to about 40 μm.

6. The electrode assembly of claim 1, wherein the thickness of the separator is from about 1.0 μm to about 25 μm.

7. The electrode assembly of claim 1, wherein each of the binder materials in the cathode and anode electrode layers is independently present in an amount from 3% to 10% by weight, based on the total weight of the electrode layer.

8. The electrode assembly of claim 1, wherein the cathode material is selected from the group consisting of $LiCoO_2$, $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, and combinations thereof, wherein each x is independently from 0.3 to 0.8; each y is independently from 0.1 to 0.45; and each z is independently from 0 to 0.2.

9. The electrode assembly of claim 1, wherein each of the conductive agents in the cathode and anode electrode layers is independently present in an amount from 2% to 10% by weight, based on the total weight of the electrode layer.

10. The electrode assembly of claim 1, wherein the anode material is selected from the group consisting of natural graphite particulate, synthetic graphite particulate, Sn particulate, $Li_4Ti_5O_{12}$ particulate, Si particulate, Si—C composite particulate, and combinations thereof.

11. The electrode assembly of claim 1, wherein each of the current collectors of the at least one cathode and anode is independently stainless steel, titanium, nickel, aluminum, copper, or electrically-conductive resin.

12. The electrode assembly of claim 1, wherein the current collector of the at least one cathode is an aluminum film, and wherein the current collector of the at least one anode is a copper film.

13. The electrode assembly of claim 1, wherein the amount of each of the cathode and anode materials is independently present in an amount from 55% to 95% by weight, based on the total weight of the cathode or anode electrode layer.

14. The electrode assembly of claim 1, wherein the at least one cathode further comprises a second cathode electrode layer formed on the surface of the cathode current collector opposite the cathode electrode layer, and the at least one anode further comprises a second anode electrode layer formed on the surface of the anode current collector opposite the anode electrode layer.

15. The electrode assembly of claim 1, wherein the salt of alginic acid comprises a cation selected from Na, Li, K, Ca, $NH_4$, Mg, Al, or a combination thereof.

16. A lithium-ion battery comprising the electrode assembly of claim 1.

* * * * *